(12) United States Patent
Barber et al.

(10) Patent No.: US 8,763,266 B2
(45) Date of Patent: Jul. 1, 2014

(54) COORDINATE MEASUREMENT DEVICE

(75) Inventors: Marc M. Barber, Deltona, FL (US);
Clark H. Briggs, DeLand, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 415 days.

(21) Appl. No.: 13/006,496

(22) Filed: Jan. 14, 2011

(65) Prior Publication Data

US 2011/0173824 A1 Jul. 21, 2011

Related U.S. Application Data

(60) Provisional application No. 61/296,555, filed on Jan. 20, 2010.

(51) Int. Cl.
*G01B 5/008* (2006.01)
*G01B 21/04* (2006.01)
*G01B 11/00* (2006.01)
*G01B 5/012* (2006.01)
*G05B 19/401* (2006.01)
*G05B 19/406* (2006.01)

(52) U.S. Cl.
CPC ............ *G05B 19/401* (2013.01); *G01B 11/007* (2013.01); *G01B 5/012* (2013.01); *G01B 21/047* (2013.01); *G05B 2219/37193* (2013.01); *G05B 2219/24067* (2013.01); *G05B 2219/45061* (2013.01); *G05B 2219/40596* (2013.01); *G05B 2219/40233* (2013.01); *G05B 19/406* (2013.01)
USPC .............................................. 33/503; 33/556

(58) Field of Classification Search
USPC .......... 33/503, 556, 557, 558, 572; 248/309.4
See application file for complete search history.

(56) References Cited

U.S. PATENT DOCUMENTS

| | | | |
|---|---|---|---|
| 1,535,312 A | 4/1925 | Hosking | |
| 1,918,813 A | 2/1932 | Kinzy | |
| 2,316,573 A | 4/1943 | Egy | |
| 2,333,243 A | 11/1943 | Glab | |
| 2,702,683 A * | 2/1955 | Cosser et al. | 248/309.4 |
| 2,748,926 A | 6/1956 | Leahy | |
| 2,924,495 A | 2/1960 | Haines | |

(Continued)

FOREIGN PATENT DOCUMENTS

| | | |
|---|---|---|
| CN | 2236119 | 9/1996 |
| CN | 2508896 | 9/2002 |

(Continued)

OTHER PUBLICATIONS

International Preliminary Report on Patentability for International Application Serial No. PCT/US2011/021259. International filing date Jan. 14, 2011. Date of Issuance Jul. 24, 2012.

(Continued)

*Primary Examiner* — R. A. Smith
(74) *Attorney, Agent, or Firm* — Cantor Colburn LLP

(57) ABSTRACT

A portable coordinate measurement device is provided. The coordinate measurement device includes at least one arm. A bracket is coupled to the arm that includes a magnetic member at one end. A probe is rotationally coupled to one end of the arm, the probe includes a first ferrous member on a first side, the probe is movable between a first position and a second position, wherein the ferrous member is adjacent the magnet when in the second position.

22 Claims, 13 Drawing Sheets

(56) References Cited

U.S. PATENT DOCUMENTS

| | | |
|---|---|---|
| 2,966,257 A | 12/1960 | Littlejohn |
| 2,983,367 A | 5/1961 | Paramater et al. |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A * | 6/1991 | Potter ..................... 224/183 |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A * | 5/1993 | Dietz et al. ................ 224/183 |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A * | 9/2000 | Rosenberg et al. ........... 702/153 |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,366,831 B1 | 4/2002 | Raab |
| 6,418,774 B1 | 7/2002 | Schwieterman et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |

(56) References Cited

U.S. PATENT DOCUMENTS

| | | |
|---|---|---|
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 * | 5/2010 | Fleischman ............. 24/460 |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 * | 3/2011 | Ferrari ............. 33/503 |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,327,555 B2 * | 12/2012 | Champ ............. 33/503 |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0115092 A1 | 6/2005 | Raab et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eidson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |

(56) References Cited

U.S. PATENT DOCUMENTS

| | | |
|---|---|---|
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0164114 A1 | 7/2011 | Kobayashi et al. |
| 2011/0173827 A1 | 7/2011 | Bailey et al. |
| 2011/0173828 A1 | 7/2011 | York |
| 2011/0178755 A1 | 7/2011 | York |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0062243 A1 | 3/2013 | Chang et al. |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 | 1/2008 |
| DE | 102008039838 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 A2 | 12/2006 |
| EP | 1429109 B1 | 4/2007 |
| EP | 1764579 B1 | 12/2007 |
| EP | 1878543 | 1/2008 |
| EP | 1967930 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 | 2/2009 |
| JP | 5581525 | 6/1955 |
| JP | 5827264 | 2/1983 |
| JP | 6313710 A | 11/1994 |
| JP | 7210586 A | 8/1995 |
| JP | 2004257927 A | 9/2004 |
| JP | 2005517908 | 5/2005 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 | 3/2008 |
| WO | 2008047171 | 4/2008 |
| WO | 2008064276 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |

(56) References Cited

FOREIGN PATENT DOCUMENTS

| | | |
|---|---|---|
| WO | 2011000955 A1 | 1/2011 |
| WO | 2011057130 | 5/2011 |
| WO | 2012038446 A1 | 3/2012 |

OTHER PUBLICATIONS

Examination Report under Section 18(3); Report dated Nov. 1, 2012; Application No. GB1210311.5.
Examination Report under Section 18(3); Report dated Nov. 6, 2012; Application No. GB1210306.5.
International Preliminary Report on Patentability mailed May 9, 2012 for International Application Serial No. PCT/US2011/021253 International filing date Jan. 14, 2011. Date of Completion May 9, 2012.
A. Hart; "Kinematic Coupling Interchangeability" Precision Engineering; vol. 28, No. 1; Jan. 1, 2004 pp. 1-15.
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
International Search Report for International Application No. PCT/US2011/021248 mailed Sep. 19, 2011.
International Search Report for International Application No. PCT/US2011/021253 mailed Sep. 26, 2011.
International Search Report for International Application No. PCT/US2011/021794 mailed Sep. 23, 2011.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Written Opinion of the International Searching Authority for International Application No. PCT/US2011/021248 mailed Sep. 19, 2011.
Written Opinion of the International Searching Authority for International Application No. PCT/US2011/021253 mailed Sep. 26, 2011.
Written Opinion of the International Searching Authority for International Application No. PCT/US2011/021794 mailed Sep. 23, 2011.
Written Opinion of the International Searching Authority mailed Apr. 12, 2011 for International Application No. PCT/US2011/021246 filed Jan. 14, 2011.
International Search Report mailed Apr. 12, 2011 for International Application No. PCT/US2011/021246 filed Jan. 14, 2011.
Information on Electro-Optical Information Systems; EOIS 3D Mini-Moire C.M.M. Sensor for Non-Contact Measuring & Surface Mapping; Direct Dimensions, Jun. 1995.
International Preliminary Report on Patentability for PCT/US2011/021274; Date of Completion Apr. 12, 2012.
International Search Report for International Application No. PCT/US2011/021273 filed Jan. 14, 2011.
International Serach Report for International Application No. PCT/US2011/050787; Mailing date Mar. 11, 2011.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Written Opinion of the International Searching Authority for International Application No. PCT/US2011/050787 mailed Nov. 3, 2011.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
GoMeasure3D—Your source for all things measurement, Baces 3D 100 Series Portable CMM from GoMeasure3D, [online], [retrieved Nov. 29, 2011], http://www.gomeasure3d.com/baces100.html.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
Examination Report under Section 18(3); Report dated Oct. 31, 2012; Application No. GB1210309.9.
Dylan, Craig R., High Precision Makes the Massive Bay Bridge Project Work. Suspended in MidAir—Cover Story—Point of Begin-

(56) References Cited

OTHER PUBLICATIONS ning, Jan. 1, 2010, [online] http://www.pobonline.com/Articles/Cover_Story/BNP_GUID_9-5-2006_A_10000000000... [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
HYDROpro Navigation, Hydropgraphic Survey Software, Trimble, www.trimble.com, Copyright 1997-2003.
Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
International Search Report and Written Opinion for International Application No. PCT/US2011/021273 filed Jan. 14, 2011.
International Search Report for International Application No. PCT/2011/020625 mailed Feb. 25, 2011.
International Search Report for International Application No. PCT/US2011/021270 mailed May 2, 2011.
International Search Report for International Application No. PCT2011/021274 filed Jan. 14, 2011.
International Search Report for International Application No. PCT2011/021276 filed Jan. 14, 2011.
International Search Report for International Application No. PCT/US2011/021246 mailed Apr. 12, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021278 mailed May 25, 2011.
Jasperneite, et al., Enhancements to the Time Synchronization Standard IEEE-1588 for a System of Cascaded Bridges, IEEE, 2004.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion for International Application No. PCT/US2011/021273 mailed Jan. 14, 2011.
Written Opinion of the International Searching Authority for International Application No. PCT/US2011/021278 mailed May 25, 2011.
Written Opinion of the International Searching Authority for International Application No. PCT/US2011/020625 mailed Feb. 25, 2011.
Written Opinion of the International Searching Authority for Internationl Application No. PCT/US2011/021270 mailed May 2, 2011.
Written Opinion for International Application No. PCT2011/021274 filed Jan. 14, 2011.
Written Opinion for International Application No. PCT/US2011/021276 filed Jan. 14, 2011.
German Office Action and English Language summary for DE 112011100292.0 filed Jul. 3, 2012, based on PCT Application US2011/021252 filed Jan. 14, 2011.
German Patent Application No. 11 2011 100 291.2 dated Dec. 20, 2012.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
FARO Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
International Search Report of the International Searching Authority for Application No. PCT/US2013/0022186; Date of Mailing: May 29, 2013.
Written Opinion of the International Searching Authority for Application No. PCT/US2013/022186; Dated of Mailing: May 29, 2013.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P. Ben-Tzvi, et al "Extraction of 3D Images Using Pitch-Actuated 2D Laser Range Findre for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Applicaton No. PCT/US2013/040321 mailed Jul. 15, 2013.
International Search Report for International Application No. PCT/US2013/040309 mailed Jul. 15, 2013.

(56) References Cited

OTHER PUBLICATIONS

Written Opinion for International Application No. PCT/US2013/040309 mailed Jul. 15, 2013.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.

International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
Romer "Romer Measuring Arms Portable CMMs for R&D and shop floor" (Mar. 2009) Hexagon Metrology (16 pages).
Examination Report for German Application No. 11 2011 100 290.4 Report dated Jul. 16, 2013; based on PCT/US2011/021247.

* cited by examiner

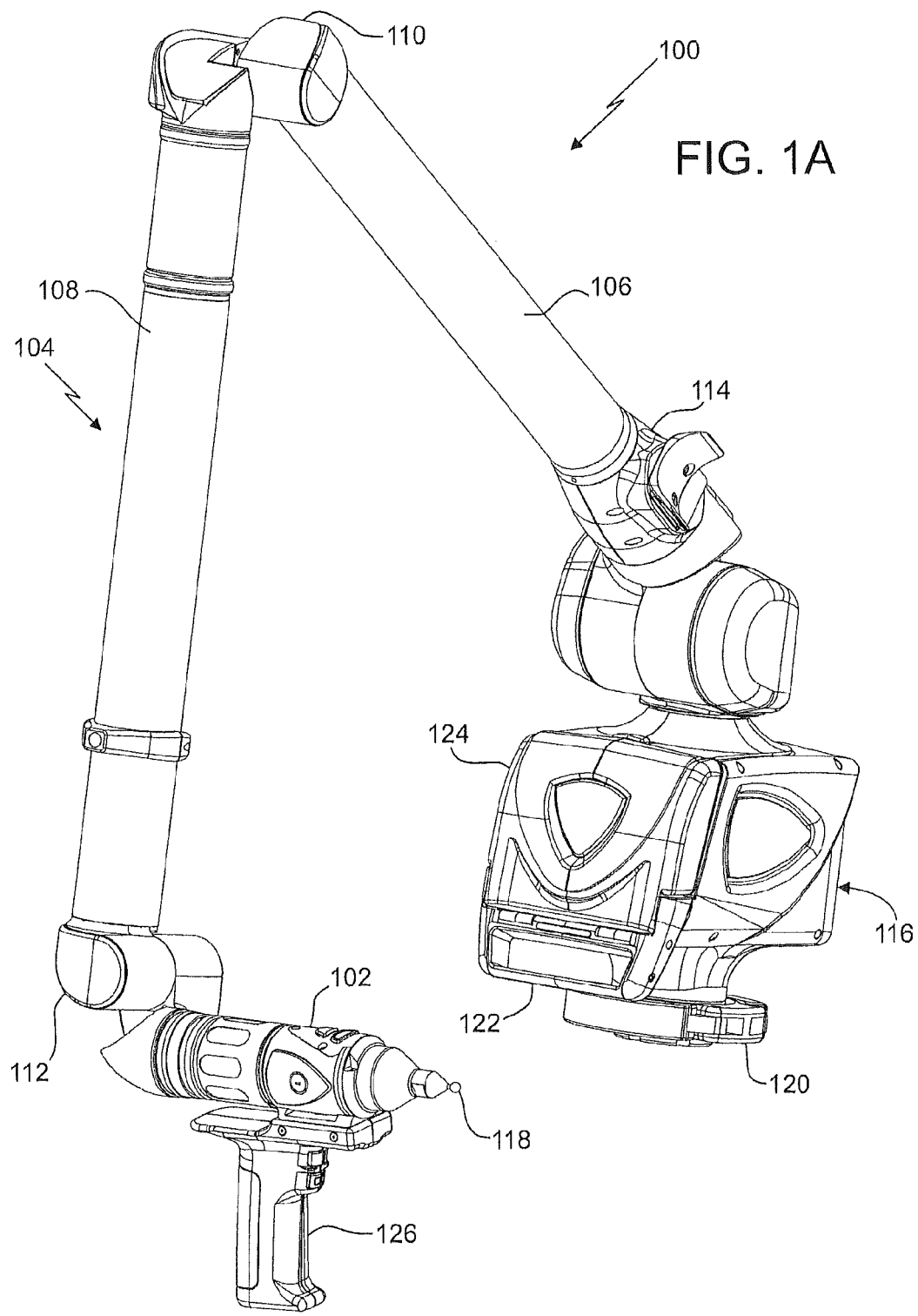

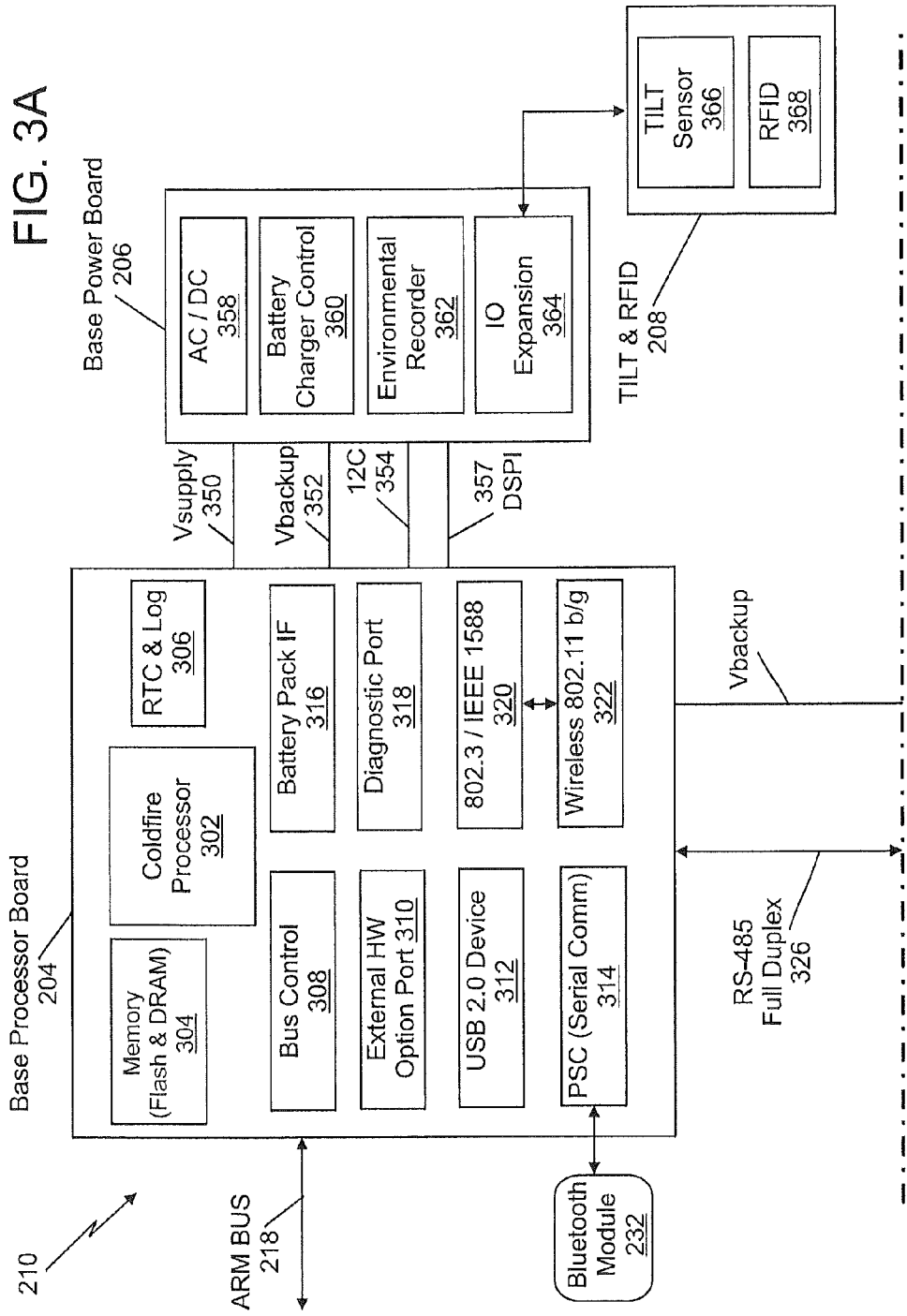

COORDINATE MEASUREMENT DEVICE

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND OF THE INVENTION

The present disclosure relates to a coordinate measuring machine, and in particular to a portable articulated arm coordinate measuring machine having a system for retaining and storing a probe end of the articulated arm.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Typically, the probe end of the arm is allowed to freely rotate about two or three axes, care must be taken, during shipment or storage for example, to avoid damaging the probe during use. Typically a strap, such as one having a hook and loop fastener for example, is used to hold the probe end against the adjacent arm segment during shipping. It should be appreciated that while the strap is convenient for shipping purposes, it is undesirable for use in operations since the dangling strap ends may interfere with the use of the arm or the probe.

Accordingly, while existing AACMM's are suitable for their intended purposes there remains a need for improvements, particularly in the securing of the probe when the articulated arm is shipped or not in use.

BRIEF DESCRIPTION OF THE INVENTION

According to one aspect of the invention, a portable coordinate measurement machine (AACMM) for measuring coordinates of an object in space is provided. The AACMM includes a manually positionable articulated arm having opposed first and second ends, the arm including a plurality of connected arm segments, the plurality of connected arm segments including an arm segment adjacent the first end, each arm segment including at least one position transducer for producing a position signal. A measurement device is attached to a first end of the AACMM. An electronic circuit is configured to receive the position signals from the transducers and provides data corresponding to a position of the measurement device. A probe end is disposed between the measurement device and the first end, the probe end being rotationally coupled to the first end and movable between a first position and a second position. A magnetic member coupling the probe end to the arm segment adjacent the first end when in the second position.

According to another aspect of the invention, AACMM for measuring coordinates of an object in space is provided. The AACMM includes a base. A manually positionable articulated arm is provided having opposed first and second ends. The second end is rotationally coupled to the base, the arm including a plurality of connected arm segments, the plurality of connected arm segments including an arm segment adjacent the first end, each arm segment including at least one position transducer for producing a position signal. A measurement device is attached to a first end of the AACMM. An electronic circuit is configured to receive the position signals from the transducers and provides data corresponding to a position of the measurement device. A probe end is disposed between the measurement device and the first end, the probe end being rotationally coupled to the first end, the probe end having a first member, the probe end movable between a first position and a second position. A magnetic member is operably coupled to the arm segment adjacent the first end, the magnetic member positioned to cooperate with the first member to magnetically couple the probe end to the arm segment adjacent the first end when the probe end is in the second position.

According to yet another aspect of the invention, another AACMM for measuring coordinates of an object in space is provided. The AACMM includes a manually positionable articulated arm having opposed first and second ends. The second end of the arm being rotationally coupled to the base, the arm including a plurality of connected arm segments, the plurality of connected arm segments including an arm segment adjacent the first end, each arm segment including at least one position transducer for producing a position signal. A measurement device is attached to a first end of the AACMM. An electronic circuit is configured to receive the position signals from the transducers and provides data corresponding to a position of the measurement device. A bracket having a first opening is sized to receive the arm segment adjacent the first end, the bracket being removably coupled to the arm segment adjacent the first end. A magnetic member is operably coupled to the bracket. A probe end is coupled to rotate about at least two axes to the first end, the probe end being movable between an operating position and a storage position. A first ferrous member is operably coupled to the probe end.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1, including FIGS. 1A and 1B, are perspective views of a portable articulated arm coordinate measuring machine (AACMM) having embodiments of various aspects of the present invention therewithin;

The detailed description explains embodiments of the invention, together with advantages and features, by way of example with reference to the drawings.

DETAILED DESCRIPTION OF THE INVENTION

Operators of AACMMs are careful with the probe end and probe tip of the AACMM to avoid damage or changing the calibration of the AACMM. Embodiments of the present invention include advantages in incorporating a holding device that secures a probe end of the AACMM to an arm segment so that the probe end is not free to move when not in use, when being moved between installations, or during shipping. Embodiments of the present invention further include advantages in allowing the probe end to be quickly and easily secured with a holding device that does not interfere with the operation of the AACMM.

Figure 1B:
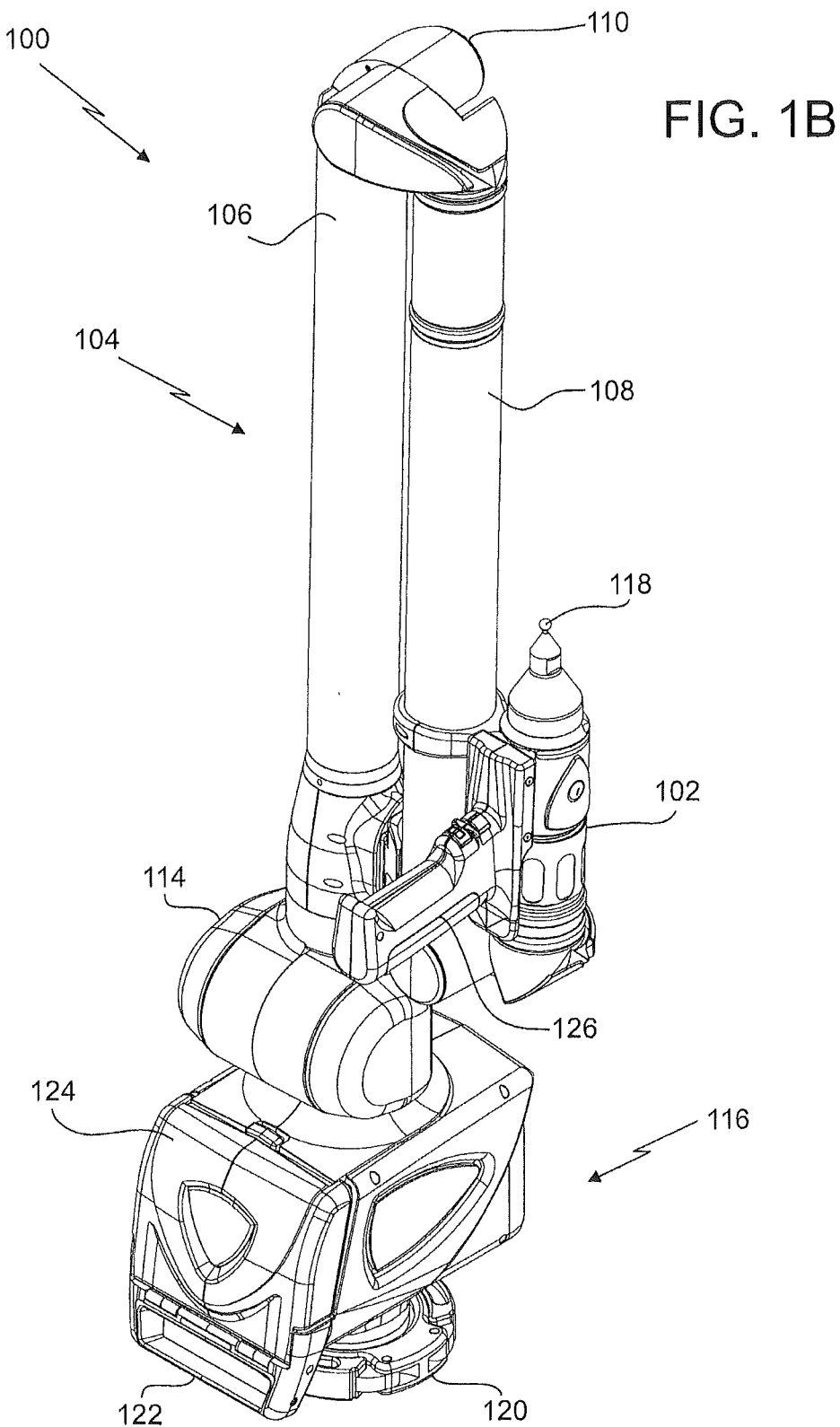

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
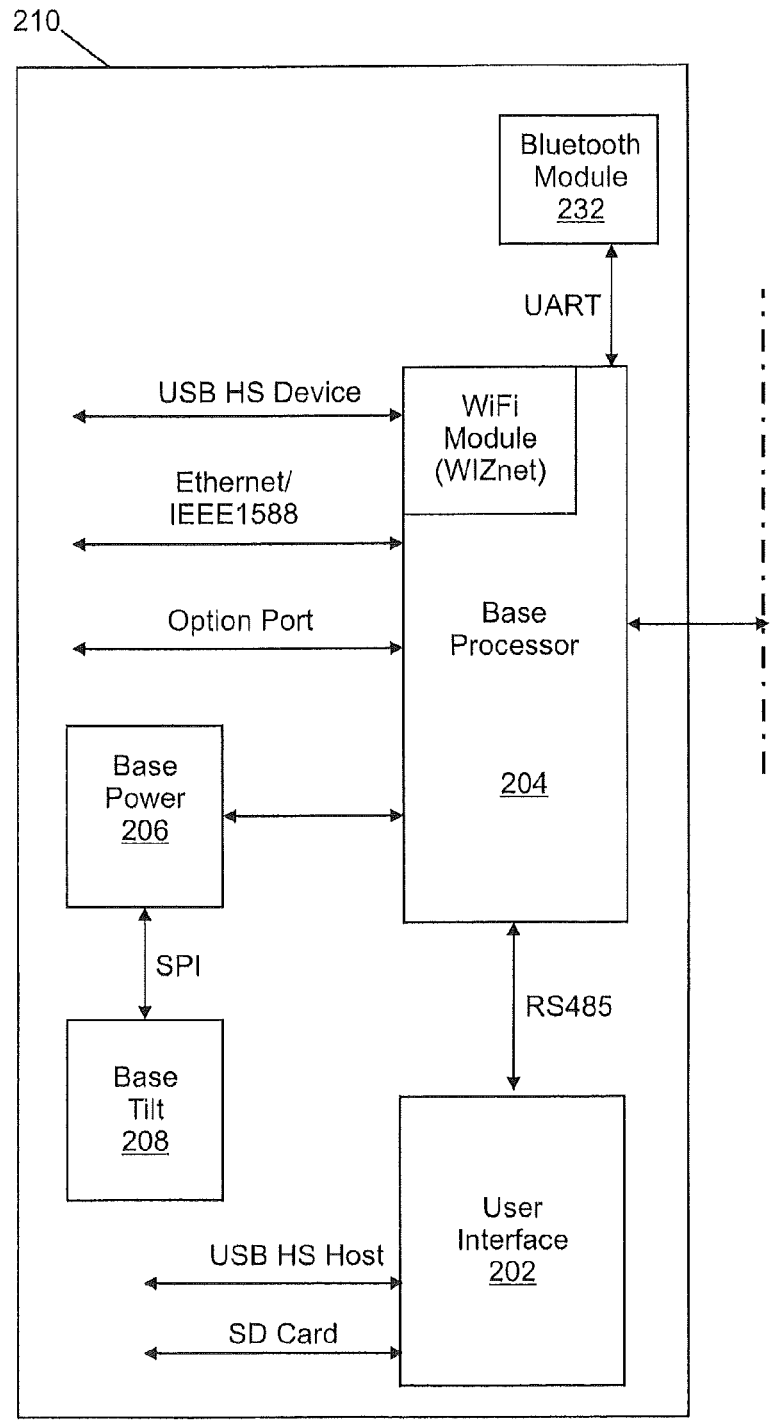
FIG. 2, including FIGS. 2A-2D taken together, is a block diagram of electronics utilized as part of the AACMM of FIG. 1 in accordance with an embodiment.
Figure 2B:
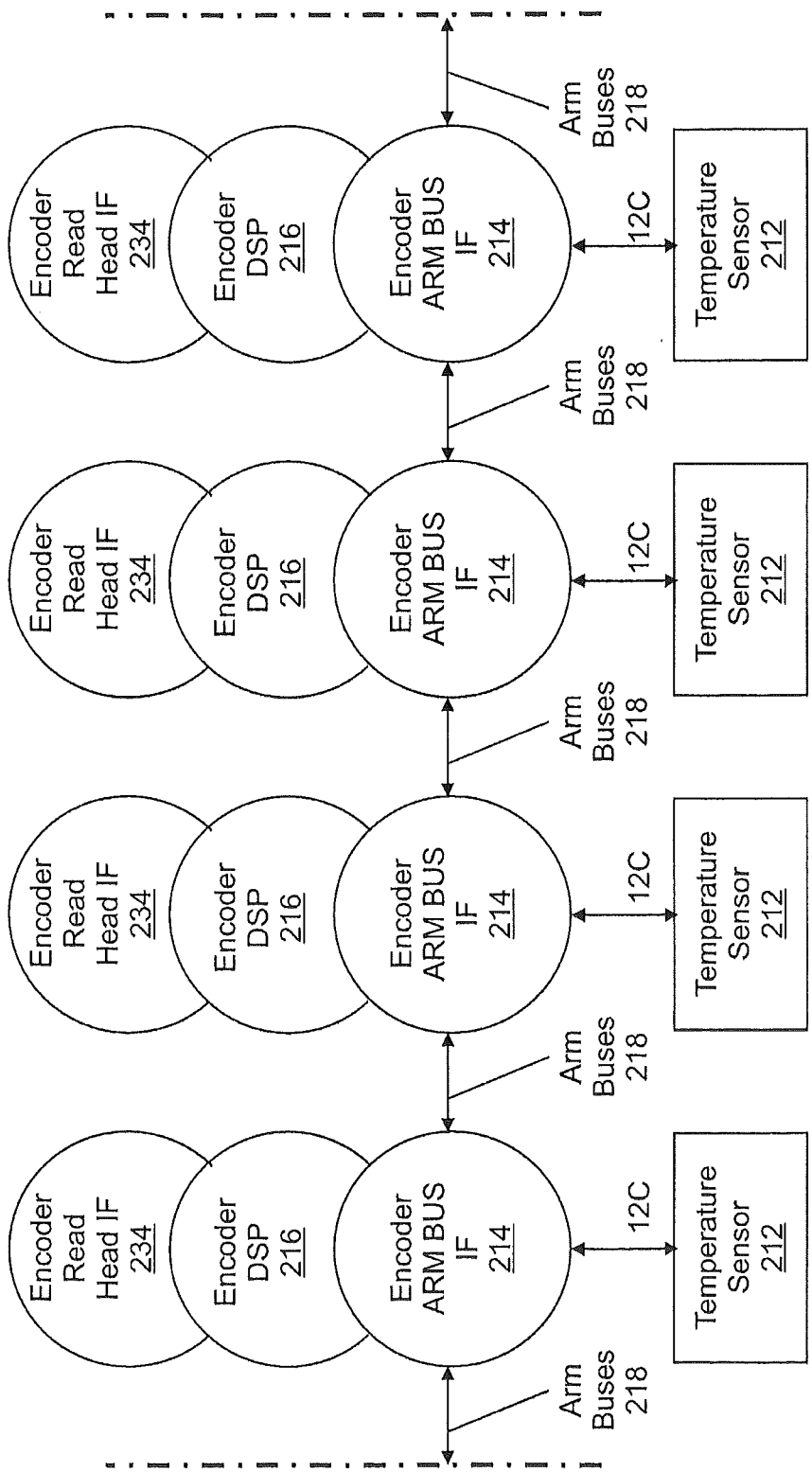
Figure 2C:
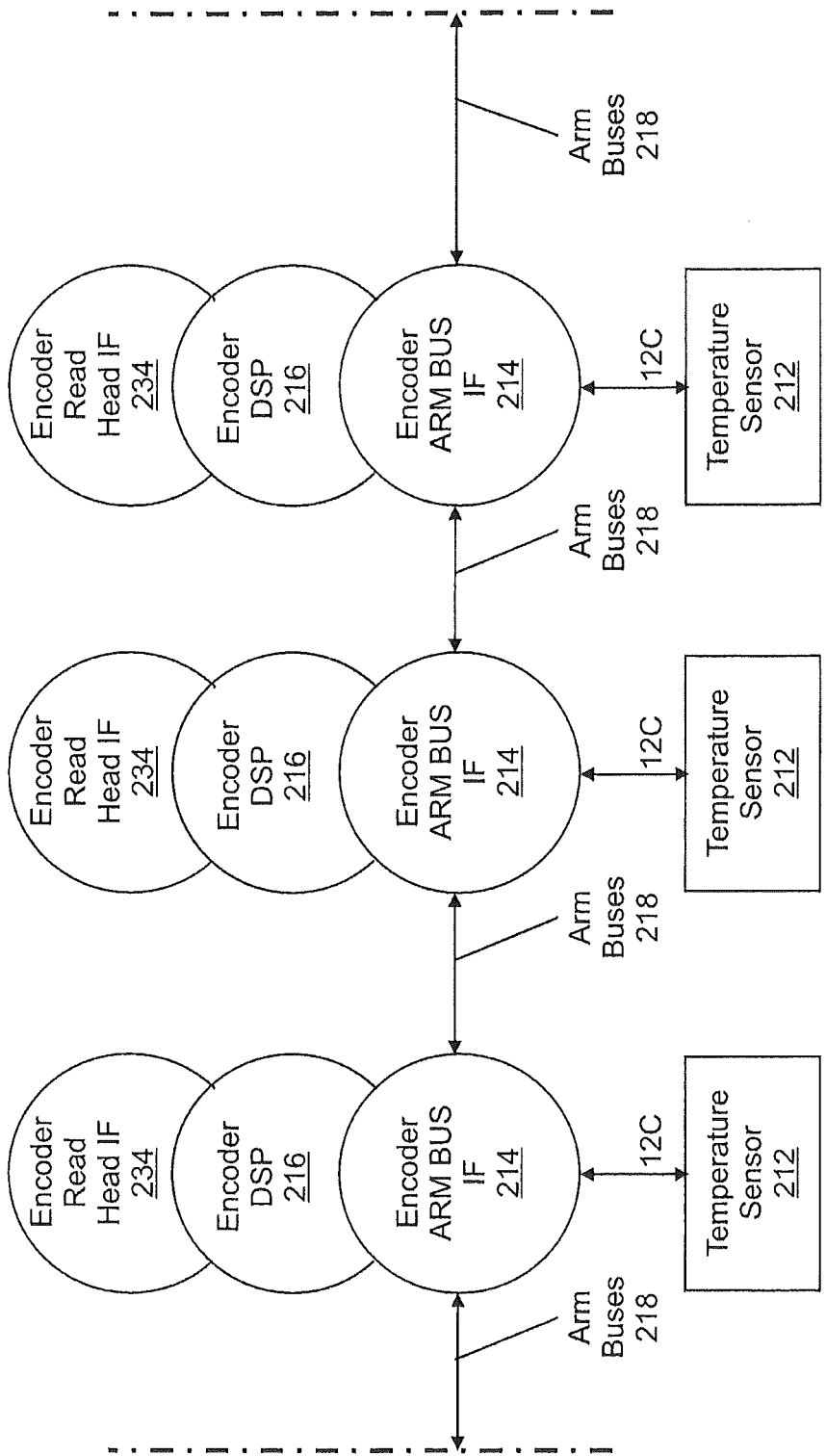
Figure 2D:
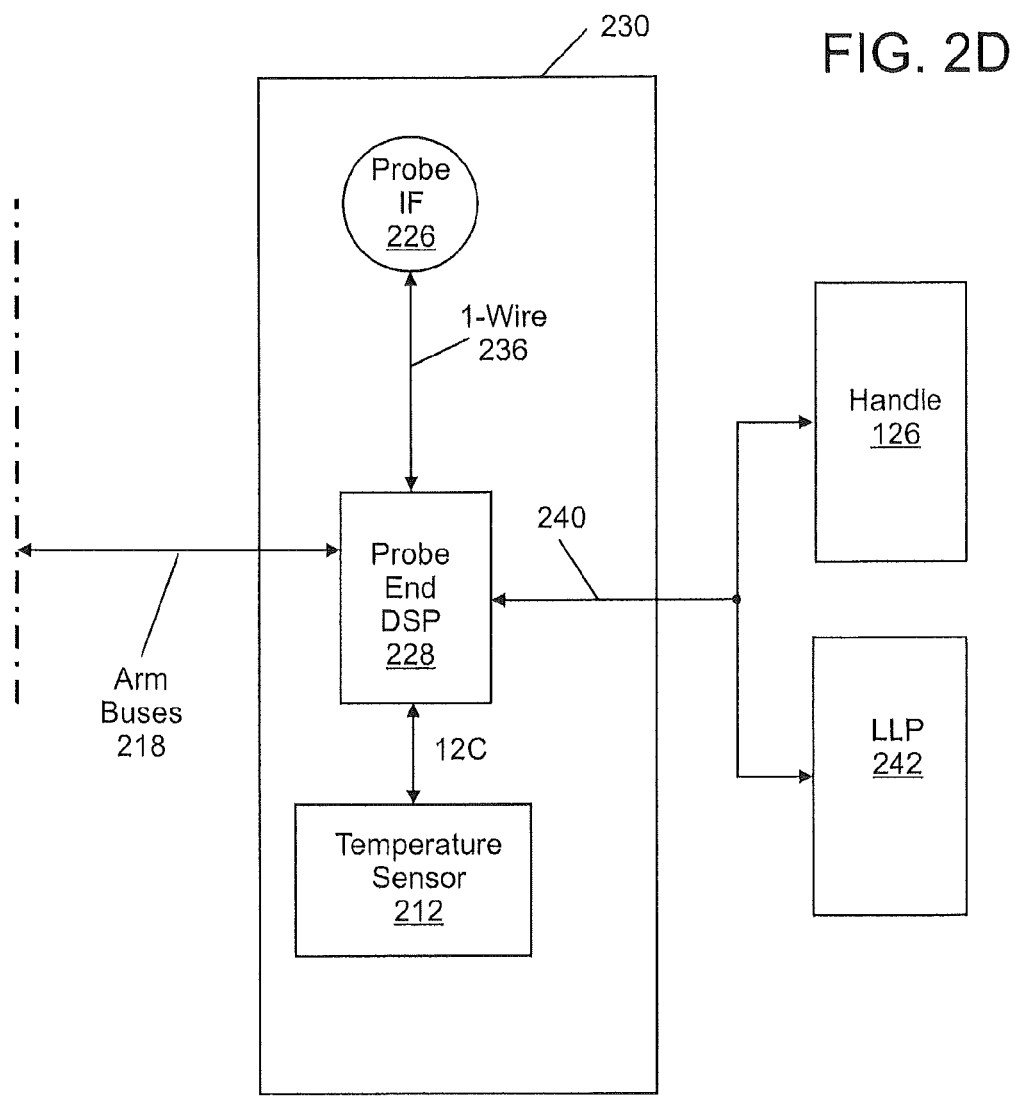
Figure 2:
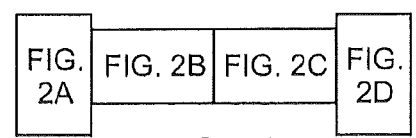

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge pairs 110, 112, 114. The probe interface 226 may connect with the probe end DSP 228 by any suitable communications protocol, including commercially-available products from Maxim Integrated Products, Inc. that embody the 1-Wire® communications protocol 236.

Figures 3, 3B:
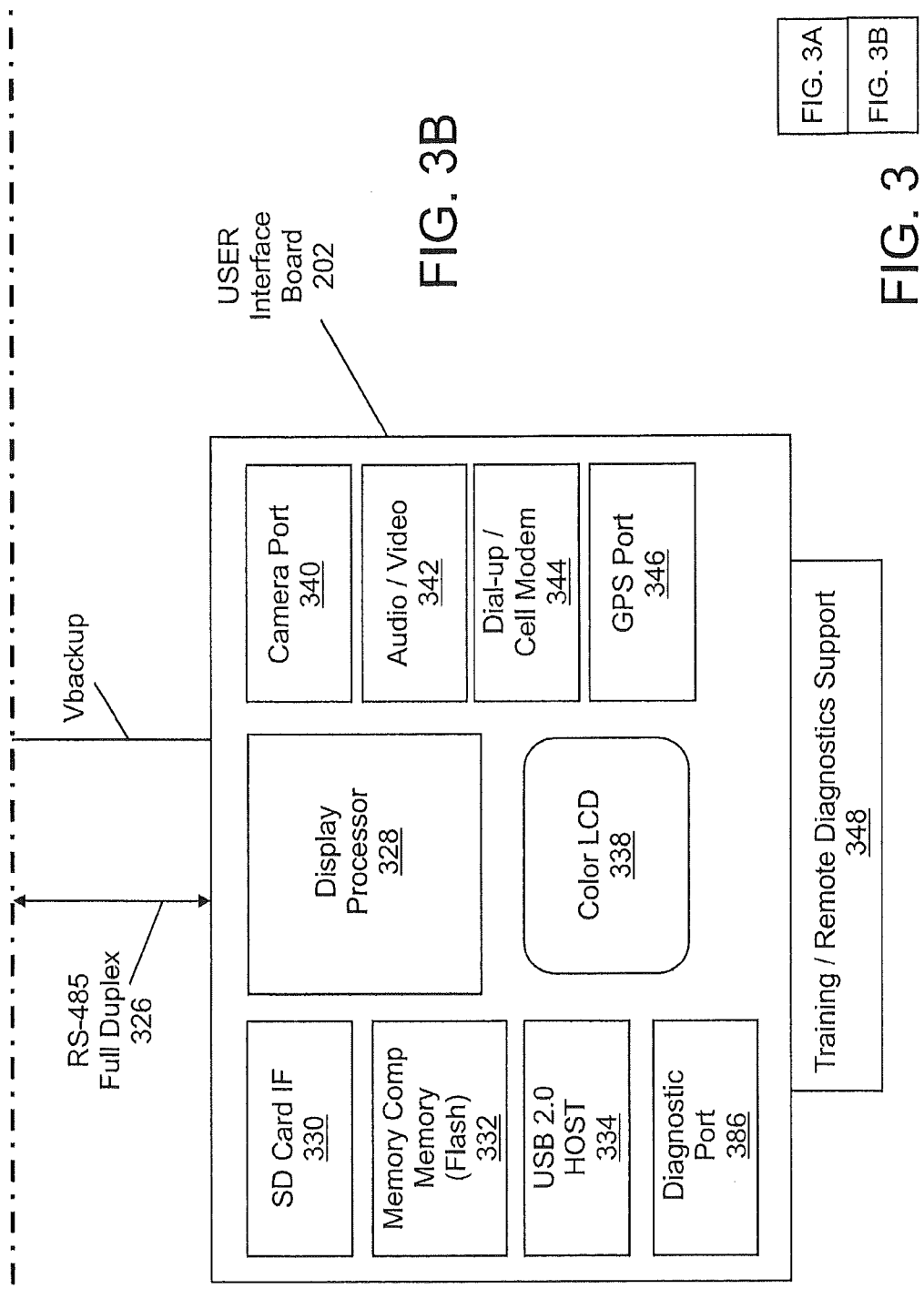
FIG. 3, including FIGS. 3A and 3B taken together, is a block diagram describing detailed features of the electronic data processing system of FIG. 2 in accordance with an embodiment.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (12C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
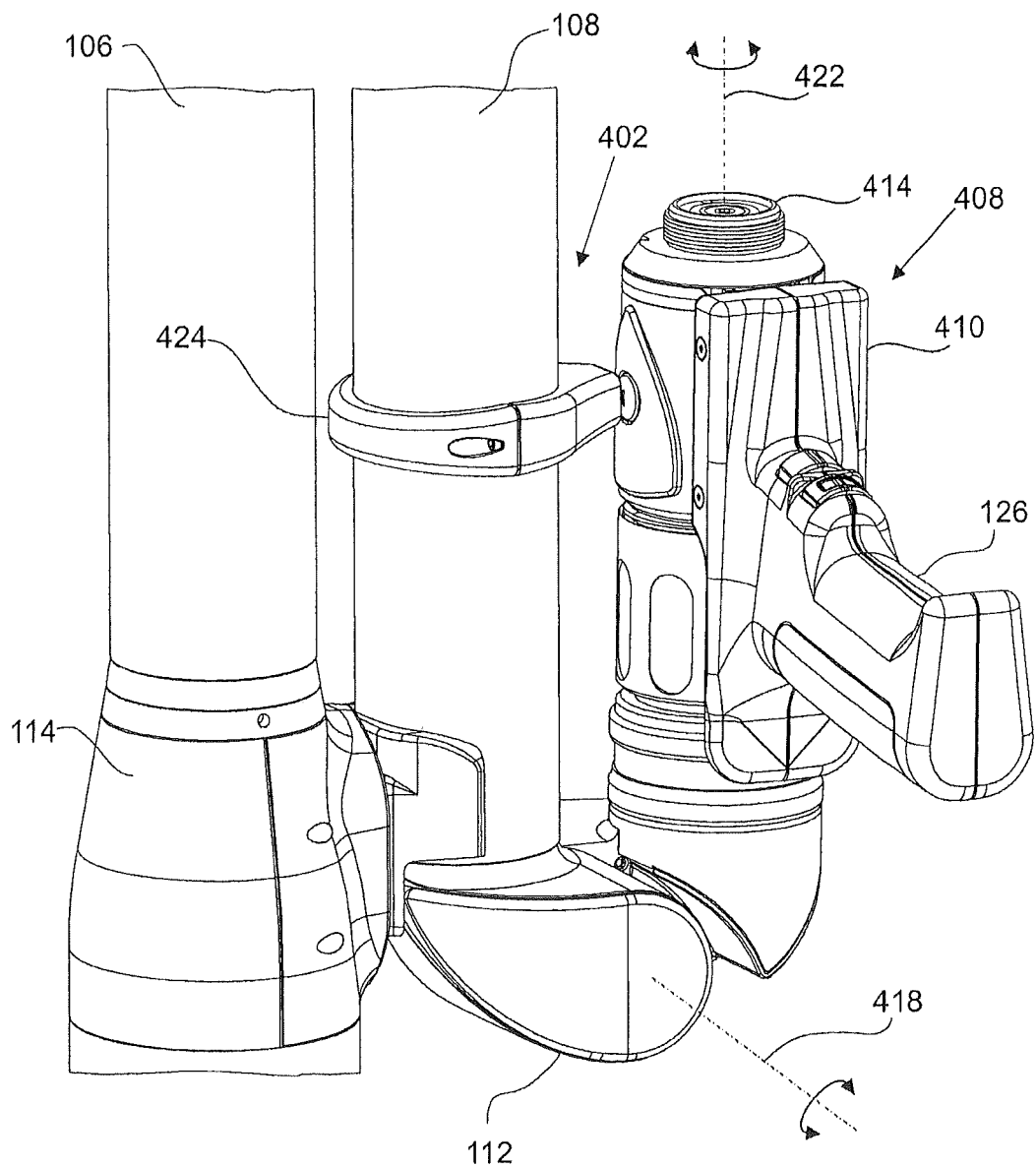
FIG. 4 is an enlarged perspective view of the probe end of the AACMM of FIG. 1.

Referring now to FIG. 4, an embodiment of the AACMM 100 having a holding system 402 is shown. The AACMM 100 includes a plurality of arm segments 106, 108 that are mounted for rotation with multiple degrees of freedom as described herein above. Coupled to the end of the second arm segment 108 is a probe end 408 having a housing or body 410, a handle 126 and a tip portion 414. The tip portion 414 includes an attachment arrangement, such as a screw thread for example, that allows for the coupling of detachable probe tip 118 (FIG. 1A) that is used to contact an object during operation.

The probe end 408 is coupled to the second arm segment 108 by a grouping of bearing cartridges 112 that allows the probe end 408 to be rotated about two axes, 418, 422. In the exemplary embodiment, the grouping of bearing cartridges 112 are arranged to minimize the restriction of movement of the probe end 408. It should be appreciated that it is desirable to have a probe end 408 that is relatively free to move during use to avoid inducing an operator error when measuring an object. It should be appreciated that since the probe end 408 may move freely, the opportunity for unintended contact of the probe end 408 and the probe tip 118 with undesired objects may be increased during use or when located in congested areas. Depending on the nature of the unintended contact, the probe end 408 or the probe tip 118 may be damaged or the calibration affected. To reduce this risk, the holding system 402 provides a means to easily, quickly and removably couple the probe end 408 to a holding bracket 424 attached to arm segment 108. This provides advantages in securing the probe 118 and probe end in a stowed position in a manner that allows the arm segments to be rotated freely around the base 116 without the probe 118 or probe end contacting any of the base 116 surfaces. This provides further advantages in preventing damage to the probe tip 118 and cosmetic damage to the paint, LCD display, power button, and other features of the base assembly.

Figure 5:
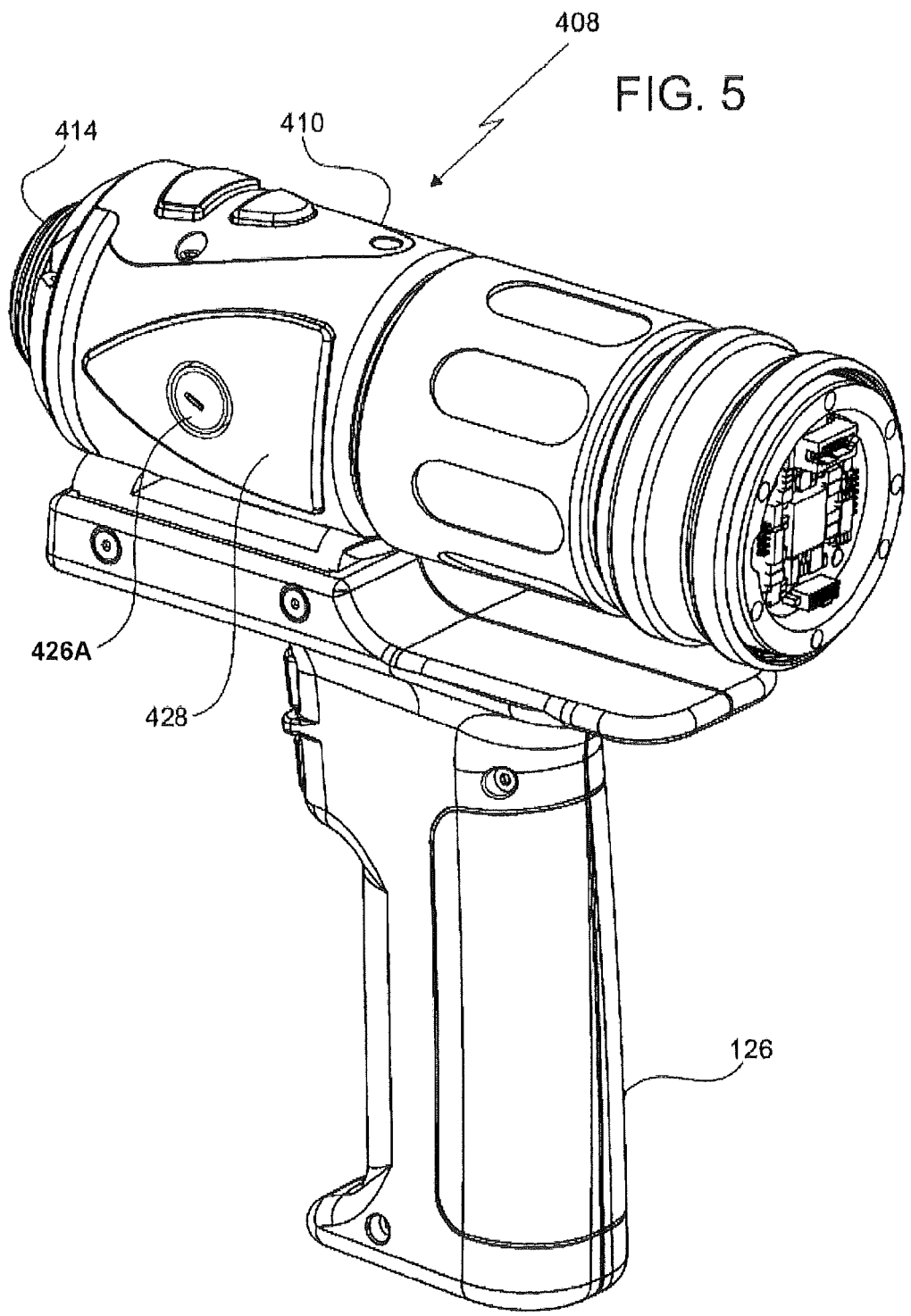
FIG. 5 is a perspective view of the probe end of the AACMM of FIG. 4.
Figure 6:
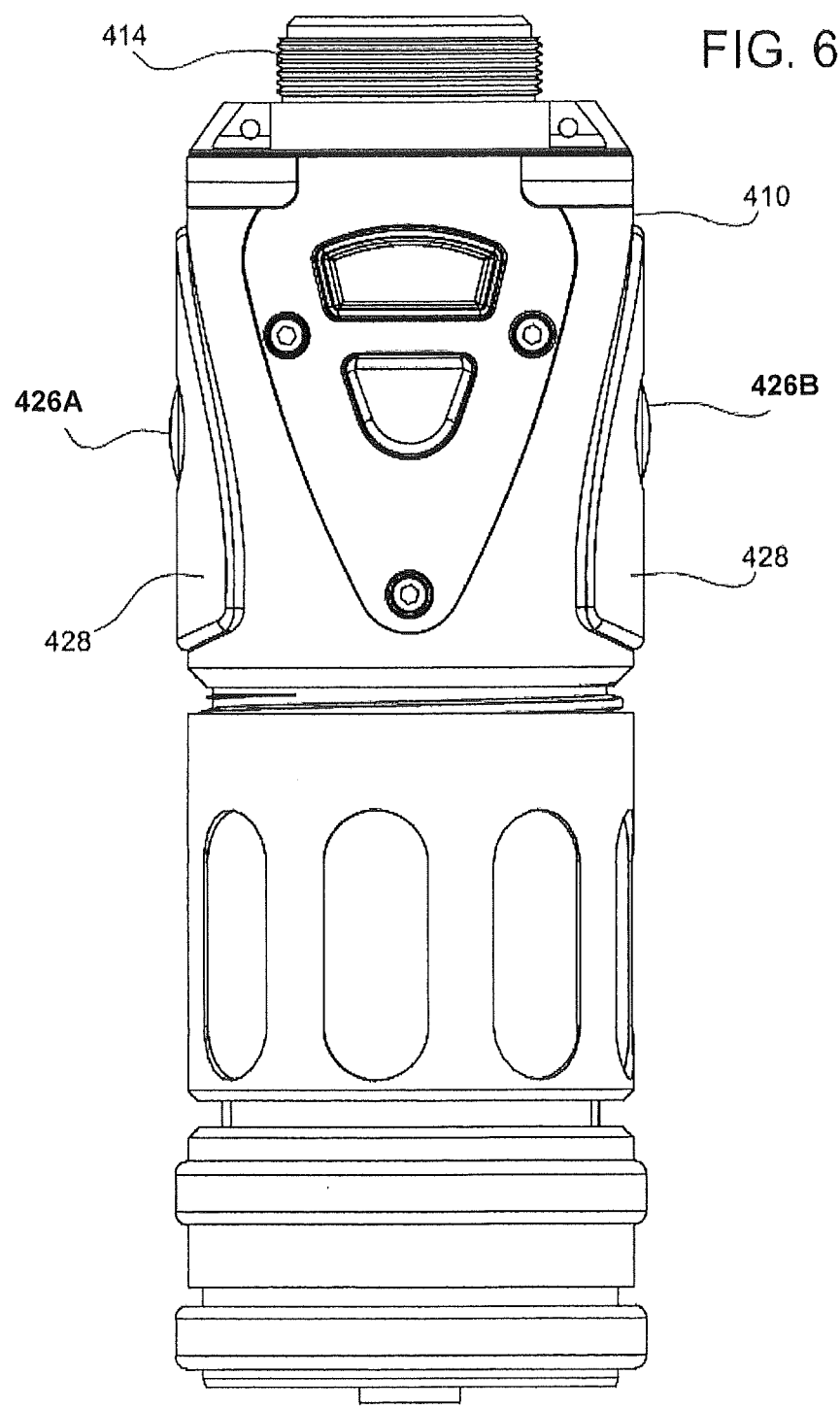
FIG. 6 is a top plan view of the probe end of FIG. 5.
Figure 7:
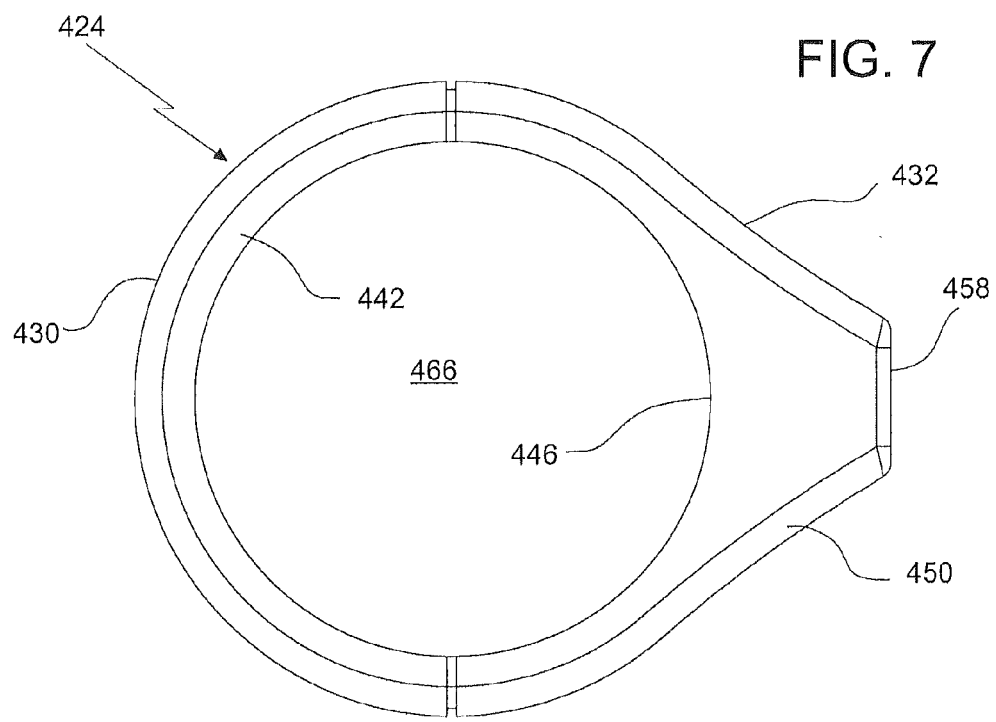
FIG. 7 is a top plan view of a probe end holder for use with the AACMM of FIG. 4.
Figure 8:
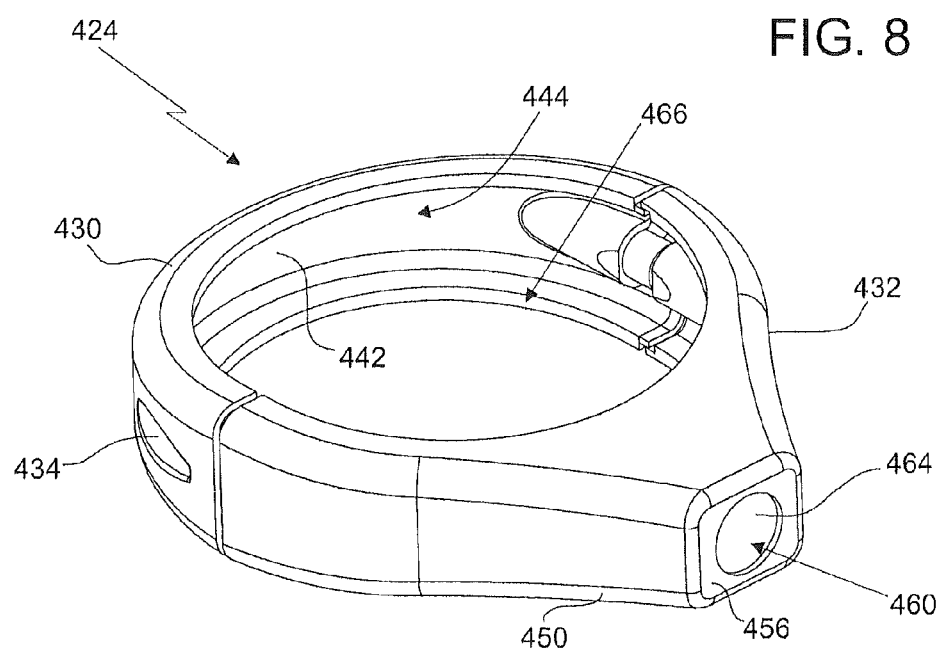
FIG. 8 is a perspective view illustration of the probe end holder of FIG. 7; and, FIG. 9 is a top plan view, partially in section, of the probe end coupled to the probe end holder.

In the exemplary embodiment, the holding system 402 includes a member 426A on the body 410 as shown in FIGS. 5-6. The member 426A may be made from any material that is attracted to a magnet, including ferrous metals such as steel for example. In one embodiment, the member 426A may be made from, but not limited to: iron; nickel; cobalt; an aluminum-nickel-cobalt alloy; titanium-cobalt-nickel-aluminum alloys; manganese compounds; and, rare earth alloys. In the exemplary embodiment, the member 426A is the head of a member having a domed cap and a threaded shaft that is used to attach a panel 428 on the body 410. In one embodiment, the probe end 408 includes two members 426A, 426B (FIG. 6) on opposite sides of the body 410. In one embodiment, the members 426A, 426B are substantially identical. In the exemplary embodiment, the member 426A has a curved outer surface 427 on one end and a threaded portion 429 on an opposite end. The curved surface 427 has at least a portion that extends beyond or outside the surface of the panel 428. It should be appreciated that the use of two members 426A, 426B provide advantages in allowing the operator to couple the probe end 408 with the handle 126 oriented in two different directions.

Figure 9:
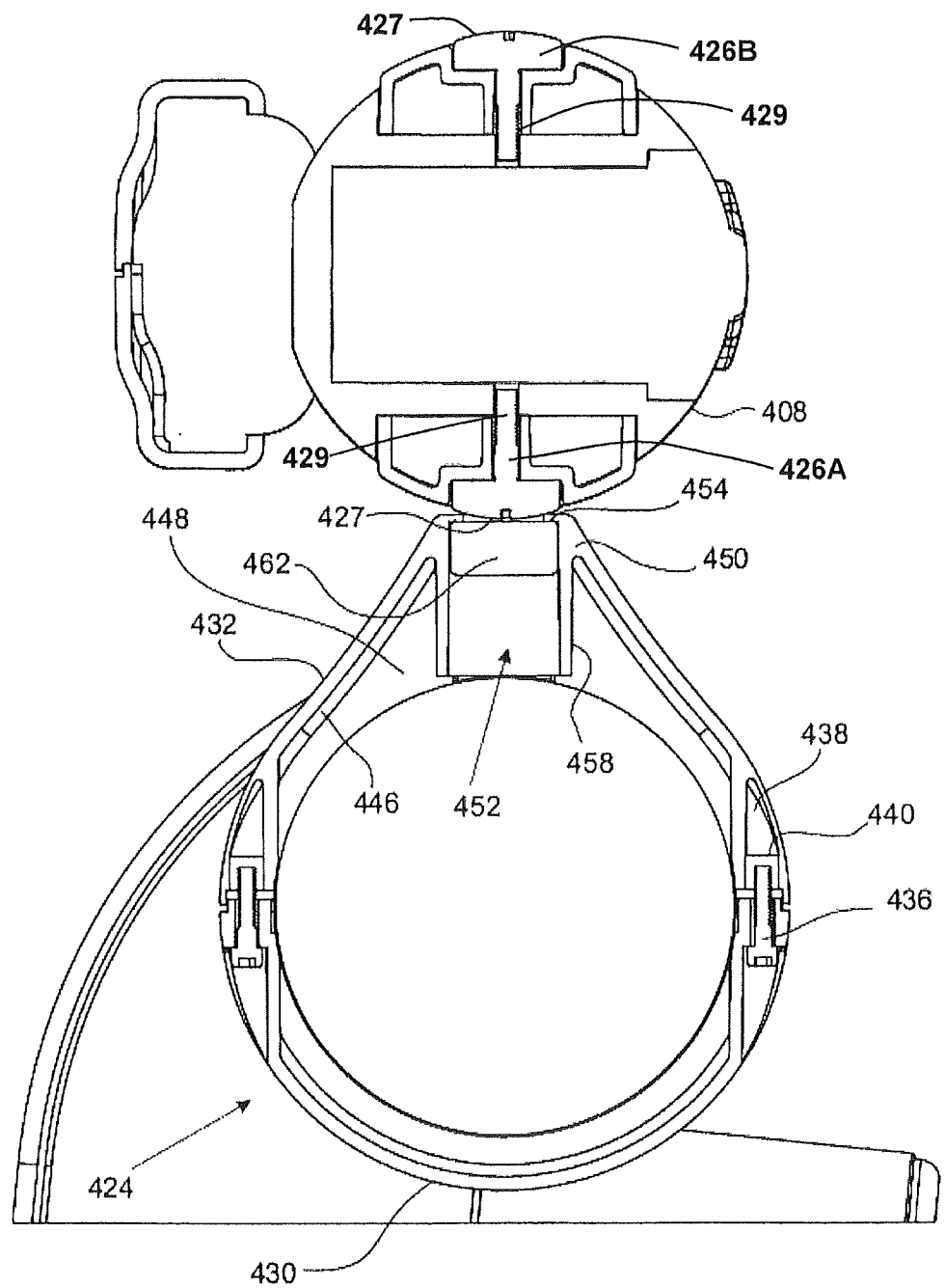

The holding bracket 424 is removably coupled to the second arm segment 108 (FIG. 4). In the exemplary embodiment, the holding bracket 424 includes a first body member 430 coupled to a second body member 432. The first body member 430 includes an opening 434 sized to receive a fastener 436 (FIG. 9), such as bolt for example. The opening 434 cooperates with an opening 438 in the second body member 432 that contains a corresponding fastener 440, such as a captured nut for example. In one embodiment, the first body member 430 has a substantially uniform wall that defines an inner surface 442 and a recessed area 444.

Similarly, the second body member 432 has a substantially uniform wall that defines an inner surface 446 and an interior portion 448. The second body member 432 also includes a projection portion 450 on a side opposite the first body member 430. An opening 452 is formed in projection portion 450 that is defined by a wall 458. The opening 452 includes a lip 454 adjacent the outer surface 456 and the wall 458. The lip 454 defines an opening 460 in the outer surface 456. As will be discussed in more detail below, in one embodiment the thickness of the lip 454 and the diameter of opening 460 are sized to receive the curved outer surface of the member 426A, 426B. The opening 452 is sized to receive a magnetic member 462. The opening 460 is smaller than the diameter of opening 452 such that the magnetic member is captured within the opening 452. In the exemplary embodiment, the magnet is made from Neodymium Iron Borate material and is adhesively bonded within the opening 452. It should be appreciated that the front surface 464 of the magnetic member 462 is offset from the outer surface 456 by the thickness of the lip 454. The first body member 430 and second body member 432 may be fabricated by an injection molding process.

The location of the magnetic member 462 in the holding bracket 424 instead of the body 410 provides advantages in reducing the opportunity for the magnetic member 462 to pick up metal particles that may be common near the machined surface of a part to be measured. The domed cap portion of the member 426A, 426B is positioned within the opening defined by the lip 454 around the magnetic member 462 so it cannot slide sideways and come loose. By rotating the handle 126, such as about the axis 422 for example, the lip 454 and domed cap arrangement creates a mechanical advantage that releases or frees the magnetic hold without having to pull straight away from the magnetic member 462. This motion avoids making the operator overcome the holding strength of the magnetic member 462, which would also tend to pull the arm 104 away from a rest position. Similarly, when attaching the probe end the process of rotating the member 426A, 426B onto the magnetic member 462 may be reversed allowing for a smooth engagement as the components are magnetically coupled.

It should be appreciated that while embodiments of the invention illustrate the magnetic member 462 as being coupled to the second arm segment 108 and the member 426A, 426B as being coupled to the body 410, the claimed invention should not be so limited. In one embodiment, the magnetic member 462 is coupled to the body 410 and the member 426A, 426B is coupled to the second arm segment 108.

The inner surfaces 442, 446 of the first body member 430 and the second body member 432 define an opening 466 sized to receive the second arm segment 108. Forming the holding bracket 424 in two halves provides an advantage in that the holding bracket 424 may be repeatably removed and installed on the second arm segment 108 without having to disassemble the AACMM 100. Further, by loosening the fasteners 440, the holding bracket 424 may be easily and quickly repositioned on the second arm segment 406 to a desired position.

It should be appreciated that while embodiments herein describe the magnetic member as being coupled to the second arm segment 108 by the holding bracket 424, the claimed invention should not be so limited. In one embodiment, the magnetic member 462 may be formed as an integral member of or molded into the second arm segment 108. In another embodiment, the magnetic member 462 is coupled to the second arm segment 108 by an adhesive.

During operation, or in preparation for shipping or moving the AACMM 100, the operator may desire to secure the probe end 408. The operator rotates the probe end 408 about one or more of the axes 418, 420, 422 as from an operating or first position to a storage or second position wherein the tip portion 414 is directed towards the bearing cartridges 110 and the handle 126 is extending towards the front (e.g. display side) or the back of the AACMM 100. As the probe end 408 is rotated to the storage position, the magnetic member 462 will attract and engage the member 426A, 426B. In one embodiment, the curved surface 427 contacts the wall 458 and a portion of the curved surface 427 is positioned within the opening 460 to hold the probe end 408 securely to the holding bracket 424. To release the probe end 408, the operator uses the handle 126 to gain a mechanical advantage and rotate the probe end 408 causing the curved surface 427 to move away from the front surface 464 allowing the magnet to disengage from the member 426A, 426B leaving the probe end 408 free for the operator to use in the measurement of objects.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measurement machine (AACMM) for measuring coordinates of an object in space, comprising:
a manually positionable articulated arm having opposed first and second ends, the articulated arm including a plurality of connected arm segments, the plurality of connected arm segments including a first arm segment having the first end;
a probe end disposed between a measurement device and the first end, the probe end being rotationally coupled to the first end and movable between a first position and a second position;
each arm segment and the probe end including at least one position transducer for producing a position signal;
an electronic circuit which receives the position signals from the transducers and provides data corresponding to a position of the measurement device; and
a magnetic member coupling the probe end to the first arm segment when in the second position.

2. The AACMM of claim 1 wherein the probe end is substantially parallel to the first arm segment when in the second position.

3. The AACMM of claim 1 further comprising:
a first member arranged on a first side of the probe end;
wherein the magnetic member is operably coupled to the first arm segment; and
wherein the first member is magnetically coupled to the magnetic member when in the second position.

4. The AACMM of claim 3 wherein the probe end further includes a second member on a second side; and
wherein the second member is magnetically coupled to the magnetic member when the probe end is in a third position.

5. The AACMM of claim 3 wherein the first member includes a head portion and a fastener portion.

6. The AACMM of claim 3 further comprising:
a bracket coupled to the first arm segment;
wherein the magnetic member is coupled to an end of the bracket; and
wherein the bracket comprises a first frame member coupled to a second frame member, the first frame member and the second frame member defining an opening sized to receive the first arm segment.

7. The AACMM of claim 6 wherein the bracket is removably coupled to the first arm segment.

8. A portable articulated arm coordinate measurement machine (AACMM) for measuring coordinates of an object in space, comprising:
a base;
a manually positionable articulated arm having opposed first and second ends, the second end being rotationally coupled to the base, the arm including a plurality of connected arm segments, the plurality of connected arm segments including a first arm segment at the first end;
a measurement device attached to the first end of the AACMM;
a probe end disposed between the measurement device and the first end, the probe end being rotationally coupled to the first end, the probe end having a first member, the probe end movable between a first position and a second position; and
a magnetic member operably coupled to the first arm segment adjacent the first end, the magnetic member positioned to cooperate with the first member to magnetically couple the probe end to the first arm segment adjacent the first end when the probe end is in the second position.

9. The AACMM of claim 8 further comprising a bracket coupled between the magnetic member and the first arm segment adjacent the first end, the bracket having an opening therein, wherein the magnetic member is disposed in the opening.

10. The AACMM of claim 9 wherein:
the magnetic member has a first surface;
the bracket has a second surface, the opening disposed on the second surface; and
the magnetic member is positioned within the opening such that the first surface is offset from the second surface.

11. The AACMM of claim 10 wherein a portion of the first member is positioned within the opening when the probe end is in the second position.

12. The AACMM of claim 11 wherein the bracket includes a first portion coupled to a second portion by at least one fastener.

13. The AACMM of claim 12 wherein the bracket is removably mounted on the arm segment adjacent the first end.

14. The AACMM of claim 13 wherein the probe end further includes a second member positioned on a side opposite the first member.

15. A portable articulated arm coordinate measurement machine (AACMM) for measuring coordinates of an object in space, comprising:
a manually positionable articulated arm having opposed first and second ends, the second end being rotationally coupled to the base, the arm including a plurality of connected arm segments, the plurality of connected arm segments including a first arm segment at the first end;
a measurement device attached to a first end of the AACMM;
a bracket having a first opening sized to receive the first arm segment, the bracket being removably coupled to the first arm segment;
a magnetic member operably coupled to the bracket;
a probe end coupled to rotate relative to the first end, the probe end being movable between first position and a second position; and
a first ferrous member operably coupled to the probe end.

16. The AACMM of claim 15 wherein the magnetic member and the first ferrous member cooperate to couple the probe end to the first arm segment when the probe end is in the second position.

17. The AACMM of claim 16 wherein the bracket includes a second opening disposed between the first opening and an outer surface, the second opening having a lip disposed adjacent the outer surface.

18. The AACMM of claim 17 wherein the magnetic member is disposed within the second opening adjacent the lip.

19. The AACMM of claim 18 wherein the first ferrous member includes a curved surface, the curved surface being in contact with the lip when the probe end is in the second position.

20. The AACMM of claim 19 wherein the first ferrous member includes a threaded portion opposite the curved surface.

21. The AACMM of claim 20 further comprising a second ferrous member coupled to a side of the probe end opposite the first ferrous member.

22. The AACMM of claim 21 wherein the bracket includes a first member and a second member coupled by a fastener.

* * * * *